United States Patent
Reinikainen et al.

(10) Patent No.: US 10,659,830 B2
(45) Date of Patent: *May 19, 2020

(54) METHOD, SYSTEM, MOBILE DEVICE, APPARATUS AND COMPUTER PROGRAM PRODUCT FOR VALIDATING RIGHTS OBJECTS

(71) Applicant: Conversant Wireless Licensing S.a.r.l., Luxembourg (LU)

(72) Inventors: Tero Reinikainen, Espoo (FI); Henri Hämäläinen, Espoo (FI); Arto Kiiskinen, Espoo (FI)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,461

(22) Filed: Apr. 10, 2019

(65) Prior Publication Data

US 2019/0335217 A1  Oct. 31, 2019

Related U.S. Application Data (63) Continuation of application No. 15/729,179, filed on Oct. 10, 2017, now Pat. No. 10,306,280, which is a
(Continued)

(51) Int. Cl.
| | |
|---|---|
| *G06F 17/30* | (2006.01) |
| *H04N 21/254* | (2011.01) |
| *G06F 21/10* | (2013.01) |
| *H04H 60/14* | (2008.01) |
| *H04N 21/414* | (2011.01) |

(Continued)

(52) U.S. Cl.
CPC ......... *H04N 21/2541* (2013.01); *G06F 21/10* (2013.01); *H04H 60/14* (2013.01); *H04N 21/41407* (2013.01); *H04N 21/4627* (2013.01); *H04H 60/40* (2013.01); *H04H 2201/37* (2013.01)

(58) Field of Classification Search
USPC ......................................... 726/20, 26, 29–30
See application file for complete search history.

(56) References Cited

U.S. PATENT DOCUMENTS

| | | | | |
|---|---|---|---|---|
| 6,363,255 B1 * | 3/2002 | Kuwahara | ............. | H04W 60/04 455/435.1 |
| 6,967,936 B1 * | 11/2005 | Laroia | .................. | H04J 3/0682 370/208 |

(Continued)

*Primary Examiner* — Amare F Tabor
(74) *Attorney, Agent, or Firm* — Conversant Wireless Licensing (57) ABSTRACT

A method, system, mobile device, apparatus and computer program product are provided for accurately determining whether one or more rights objects associated with a mobile device are valid. In particular, a secure time source (e.g., DRM clock or time) may be maintained by the mobile device and used to check the validity of the one or more rights objects. In order to ensure that the secure time source or clock remains accurate, the mobile device may update the secure time source by regularly requesting and receiving the DVB-H network time from a DVB-H network entity. Because the DVB-H network time is secure, accurate and readily accessible, it provides an ideal tool for correcting possible drift in the mobile device's secure time source.

7 Claims, 4 Drawing Sheets

Related U.S. Application Data continuation of application No. 14/868,127, filed on Sep. 28, 2015, now Pat. No. 9,807,437, which is a continuation of application No. 11/651,652, filed on Jan. 9, 2007.

(51) Int. Cl.
*H04N 21/4627* (2011.01)
*H04H 60/40* (2008.01)

(56) References Cited

U.S. PATENT DOCUMENTS

| | | | | |
|---|---|---|---|---|
| 7,039,436 | B1 * | 5/2006 | Kakehi | H04B 7/022 370/503 |
| 7,467,382 | B2 * | 12/2008 | Watanabe | H04L 29/06 348/E7.071 |
| 7,620,410 | B2 * | 11/2009 | Takizawa | H04H 40/18 370/350 |
| 7,818,553 | B2 * | 10/2010 | Waltermann | G06F 21/10 705/1.1 |
| 2002/0156737 | A1 * | 10/2002 | Kahn | G06F 21/10 705/51 |
| 2003/0163692 | A1 * | 8/2003 | Kleinsteiber | H04L 63/08 713/169 |
| 2005/0066353 | A1 * | 3/2005 | Fransdonk | H04L 63/083 725/29 |
| 2005/0282520 | A1 * | 12/2005 | Coureau | G06F 21/10 455/410 |
| 2007/0206537 | A1 * | 9/2007 | Cam-Winget | H04L 63/162 370/331 |
| 2007/0266417 | A1 * | 11/2007 | Jendbro | H04N 21/41407 725/132 |
| 2007/0291676 | A1 * | 12/2007 | Berggren | H03L 1/025 370/328 |

* cited by examiner

METHOD, SYSTEM, MOBILE DEVICE, APPARATUS AND COMPUTER PROGRAM PRODUCT FOR VALIDATING RIGHTS OBJECTS

CROSS-REFERENCE TO RELATED APPLICATIONS

This application is a continuation of U.S. patent application Ser. No. 15/729,179 filed on Oct. 10, 2017, which is a continuation of Ser. No. 14/868,127 filed on Sep. 28, 2015, now U.S. Pat. No. 9,807,437, which is a continuation of U.S. patent application Ser. No. 11/651,652 filed Jan. 9, 2007. The above-identified applications are herein incorporated by reference in their entirety.

FIELD

Exemplary embodiments of the present invention relate, generally, to a secure source of time associated with a mobile device and, in particular, to a technique for maintaining the accuracy of the secure time source.

BACKGROUND

Digital Rights Management (DRM) refers to a set of methods that ensures that certain content and services can only be accessed or used by a mobile device operator when the relevant conditions (e.g., access conditions) have been met. DRM Rights Objects (ROs) are the collections of permissions, keys and other attributes that are linked to various items of the content and services. These ROs have certain time constraints for specifying when the rights are valid, and at certain points during the protected content consumption cycle, the ROs will need to be changed. For example, a standard cycle for RO change in IP Datacast systems is one month. (See "IP Datacast over DVB-H: Service Purchase and Protection (SPP)," DVB Document A100, December 2005, available at http://www.dvb-h.org/PDF/a100.tm3455r3.cbms1476.IPDC SPP.pdf.) In current systems, a user may receive two ROs, one for the current month and one for the next month.

In order to determine, therefore, whether a mobile device operator has the necessary access rights to particular items of content or of a service, the mobile device needs to be able to accurately and securely keep track of time. More specifically, the mobile device needs to be able to accurately know when each RO is no longer valid and, therefore, when to start a new RO.

In many mobile devices, a specific DRM clock, or DRM time, is used to check the validity of a user's DRM rights. The DRM clock, or time, represents a secure, non user-changeable time source that measures time in the UTC (Universal Time Coordinated—e.g., zulu or Greenwich Mean Time (GMT)) time scale. One problem associated with this, and generally any, secure time source, however, is that it is susceptible to drift. In other words, if a clock or time source, such as the DRM time, is not regularly updated, the time provided is likely to drift away from its originally-set time and, therefore, no longer provide the correct time. If the DRM time is wrong or old, a user may be prevented from consuming ORM protected content, since the current RO associated with that content may no longer be valid, and a new RO may not have been started appropriately.

One solution to this problem has been to use the NITZ (Network Identity and Time Zone) network time to update the DRM time. However, not all operators have access to the NITZ time, and one cannot easily determine which operators have access and at what locations.

A need, therefore, exists for a way to consistently and accurately update a secure time source that is associated with a mobile device and may be used to determine whether a user has rights to certain items of content or of a service.

BRIEF SUMMARY

In general, exemplary embodiments of the present invention provide an improvement over the known prior art by, among other things, providing a technique for updating the secure, or non user-changeable, time source of the mobile device by regularly requesting and receiving the DVB-H (Digital Video Broadcast-Handheld) network time from a DVB-H network entity. DVB-H, which is the mobile version of the international digital television (DTV) standard DVB that uses MPEG-2 (Motion Picture Experts Group 2) for video compression and MPEG-2 and Dolby Digital for audio, is a technical specification for bringing broadcast services to battery-powered handheld receivers. (See ETSI EN 302 304 v.1.1.1 "Digital Video Broadcasting (DVB); Transmission System for Handheld Terminals (DVB-H)," November 2004, available at http://www.dvb-h.org/PDF/DVB-H%20Specification%20-%20En302304.V1.1.1.pdf). The DVB-H network maintains a DVB-H network time that is both accurate and secure and is available to any mobile device that is configured to receive DVB-H broadcasts and is within a DVB-H signal coverage area. As a result, the DVB-H network time provides a reliable source of time that can be consistently retrieved and used to update the secure time source (e.g., DRM clock or time) of the mobile device this is used for checking the validity of one or more rights objects associated with the mobile device.

In accordance with one aspect, a method is provided of determining whether one or more rights objects associated with a mobile device are valid. In one exemplary embodiment, the method includes: (1) retrieving a DVB-H (Digital Video Broadcast-Handheld) network time; (2) updating a secure clock maintained on the mobile device based at least in part on the DVB-H network time; and (3) using the secure clock to determine whether one or more rights objects associated with the mobile device are valid.

In one exemplary embodiment, the secure clock may comprise a Digital Rights Management (DRM) clock. In another exemplary embodiment, retrieving a DVB-H network time may involve automatically requesting the DVB-H network time from a DVB-H network entity upon boot up of the mobile device.

According to one exemplary embodiment, updating the secure clock based at least in part on the DVB-H network time may involve determining a difference between the DVB-H network time retrieved and a user-set clock also maintained on the mobile device; storing the difference in a memory associated with the mobile device; and updating the secure clock based at least in part on the stored difference. The method of this exemplary embodiment may further include retrieving the DVB-H network time every predetermined interval of time; determining a new difference between the DVB-H network time retrieved and the user-set clock; comparing the new difference to the stored difference; and if the new difference differs from the stored difference, replacing the stored difference with the new difference and updating the secure clock based at least in part on the new difference.

In accordance with another aspect, a system is provided for determining whether one or more rights objects associated with a mobile device are valid. In one exemplary embodiment, the system may include a DVB-H (Digital Video Broadcast-Handheld) network entity and a mobile device capable of accessing the DVB-H network entity. The mobile device of this exemplary embodiment may, in turn, include a secure clock, a processor configured to maintain the secure clock, and a memory in communication with the processor that stores one or more rights objects associated with the mobile device, as well as an application executable by the processor. In one exemplary embodiment, the application may be configured, upon execution, to: (1) retrieve a DVB-H network time from the DVB-H network entity; (2) update the secure clock based at least in part on the DVB-H network time retrieved; and (3) use the secure clock to determine whether the one or more rights objects are valid.

According to another aspect, a mobile device is provided that is configured to determine whether one or more rights objects associated with the mobile device are valid. In one exemplary embodiment the mobile device includes a secure clock, a processor configured to maintain the secure clock, and a memory in communication with the processor that stores an application executable by the processor, wherein the application is configured, upon execution, to: (1) retrieve a DVB-H (Digital Video Broadcast-Handheld) network time; (2) update the secure clock based at least in part on the DVB-H network time; and (3) use the secure clock to determine whether one or more rights objects associated with the mobile device are valid.

According to yet another aspect, an apparatus is provided that is capable of determining whether one or more rights objects associated with a mobile device are valid. In one exemplary embodiment, the apparatus may include: (1) means for retrieving a DVB-H (Digital Video Broadcast-Handheld) network time; (2) means for updating a secure clock maintained on the mobile device based at least in part on the DVB-H network time; and (3) means for using the secure clock to determine whether one or more rights objects associated with the mobile device are valid.

In accordance with yet another aspect, a computer program product is provided for determining whether one or more rights objects associated with a mobile device are valid. The computer program product contains at least one computer-readable storage medium having computer-readable program code portions stored therein. The computer-readable program code portions of one exemplary embodiment include: (1) a first executable portion for retrieving a DVB-H (Digital Video Broadcast-Handheld) network time; (2) a second executable portion for updating a secure clock maintained on the mobile device based at least in part on the DVB-H network time; and (3) a third executable portion for using the secure clock to determine whether one or more rights objects associated with the mobile device are valid.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a method, system, mobile device, apparatus and computer program product for accurately determining whether one or more rights objects associated with a mobile device are valid. In particular, according to exemplary embodiments, a secure (i.e., non user-changeable) time source (e.g., DRM clock or time) may be maintained by the mobile device and used to check the validity of the one or more rights objects. In order to ensure that the secure time source or clock remains accurate, the mobile device may update the secure time source by regularly requesting and receiving the DVB-H network time from a DVB-H network entity. Because the DVB-H network time is secure, accurate and readily accessible, it provides an ideal tool for correcting possible drift in the mobile device's secure time source.

Figure 1:
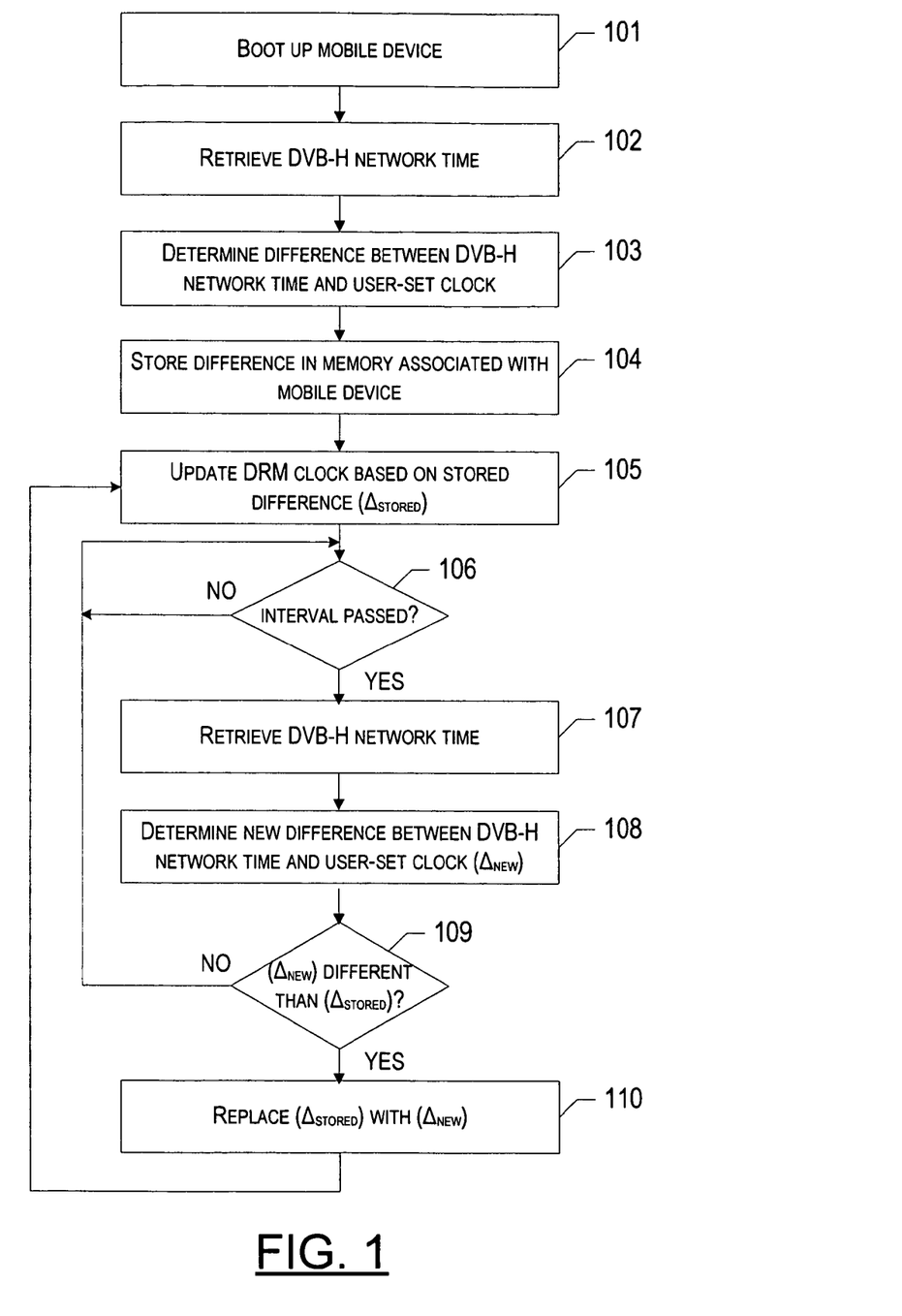
FIG. 1 is a flow chart illustrating the steps which may be taken in order to maintain an accurate, secure and non user-changeable time source or clock for use in validating rights objects in accordance with exemplary embodiments of the present invention.

Method of Maintaining an Accurate and Secure Time Source for Validating Rights Objects Reference is now made to FIG. 1, which provides a flow chart illustrating the steps or operations which may be taken in order to maintain, on a mobile device, an accurate and secure (i.e., non user-changeable) time source (e.g., DRM clock or time) that can be used to check the validity of one or more rights objects associated with the mobile device. As shown, the process may begin at Step 101, where the mobile device is first turned on or booted up. Upon boot-up, the mobile device may immediately retrieve the DVB-H network time from the DVB-H network. (Step 102). In particular, according to one exemplary embodiment, the mobile device may include means, such as a software component, referred to for exemplary purposes only as an IPDC (IP Datacasting) Manager, that is configured, upon boot-up of the mobile device, to instruct the mobile device receiver to request and retrieve the DVB-H network time. The mobile device receiver may, in response, request the DVB-H network time from a DVB-H network entity, such as a server or similar electronic device associated with the DVB-H network, that maintains the DVB-H network time and is capable of being accessed via a communication network. If the mobile device is within a DVB-H signal coverage area, the DVB-H network entity will return the DVB-H time to the mobile device receiver. In contrast, if the mobile device is outside a DVB-H signal coverage area, an error message may be returned. If the latter occurs, in one exemplary embodiment, the mobile device receiver may repeat its request some predetermined number of times or until the DVB-H time is returned.

Assuming that the DVB-H network time was successfully retrieved, the process continues to Steps 103 and 104, where the difference between the DVB-H network time and a user-set clock associated with the mobile device is determined and stored in a memory associated with the mobile device. The stored difference ($\Delta_{stored}$) can then be used, in Step 105, to update the DRM clock, or similar secure time source. In particular, according to one exemplary embodiment, the difference between the secure time source (e.g., DRM clock or time) and the user-set clock may be determined and compared to the stored difference ($\Delta_{stored}$). If they are not the same (i.e., if the secure time source differs from the user-set clock more or less than the DVB-H network time differs from the same user-set clock), then the secure time source may be updated accordingly.

As one or ordinary skill in the art will recognize, the above provides just one technique that may be used for updating the mobile device's secure time source (e.g., DRM clock or time) based on the DVB-H network time. Other similar techniques may likewise be used without departing from the spirit and scope of exemplary embodiments of the present invention. In particular, in an alternative embodiment, the retrieved DVB-H network time itself may be stored in memory associated with the mobile device and then directly used to update the mobile device's secure time source (i.e., rather than calculating and storing the difference between the DVB-H network time and the user-set clock). In particular, when the DVB-H network time is retrieved it may replace the time associated with the mobile device's secure time source. One advantage, however, to using the difference is that the secure clock may be updated when, for example, the DVB-H network time is unavailable.

Regardless of how the DVB-H network time is used to update the secure time source of the mobile device in Step 105, in order to ensure that the secure time source remains accurate well after boot-up, exemplary embodiments of the present invention provide for regular updates of the secure time source based on the DVB-H network time. In particular, according to one exemplary embodiment, the mobile device may be configured to continuously retrieve the DVB-H network time after a predetermined interval of time (e.g., 30 min) has passed from the last time the DVB-H network time was successfully retrieved. In one exemplary embodiment, upon boot-up of the mobile device, the IPDCManager, discussed above, may be configured to access a configuration file, referred to herein for exemplary purposes only as IPDC.ini, that is likewise stored in memory on the mobile device in order to retrieve the value of the predetermined interval. In this exemplary embodiment, the IPDC.ini file may include this parameter (e.g., DRMClockUpdateInterval=30 min), along with various other predetermined parameters associated with IP Datacasting over DVB-H.

Returning to FIG. 1, a loop may be created at Step 106, wherein the mobile device continues to ask whether the predetermined interval of time has passed until the answer is yes (i.e., the mobile device may wait until the predetermined interval of time has passed since the last time the DVB-H time was successfully retrieved). Once the interval has passed, the DVB-H network time is again retrieved, for example in the manner discussed above with regard to Step 102, and the difference between the newly retrieved DVB-H network time and the user-set clock ($\Delta_{new}$) may be determined. (Steps 107 and 108, respectively). If the difference between the newly retrieved DVB-H network time and the user-set clock ($\Delta_{new}$) differs from the difference stored in the mobile device memory ($\Delta_{stored}$), as determined in Step 109, the mobile device may replace the stored difference with the calculated difference (i.e., $\Delta_{stored}$ becomes $\Delta_{new}$) (Step 110), and return to Step 105, where the mobile device's secure time source (e.g., DRM clock or time) is again updated based on the currently stored difference ($\Delta_{stored}$). If on the other hand, it is determined, in Step 109, that the new difference ($\Delta_{new}$) is the same as the stored difference ($\Delta_{stored}$), the process may loop back to Step 106, where the mobile device again waits until another predetermined interval of time has passed. According to one exemplary embodiment, the above process may continue indefinitely until the mobile device is turned off.

While not specifically shown in FIG. 1, at any point in the above process, it may become necessary to determine the validity of one or more ROs (i.e., one or more collections of permissions, keys and other attributes which are linked to items of content or of a service). As noted above, in order to do so, the time period during which the RO is valid must be checked against a secure time source maintained by the mobile device (e.g., a DRM clock or time). According to exemplary embodiments of the present invention, this is now possible by using the secure time source that has been regularly updated in the above-described manner based on the DVB-H network time.

Figure 2:
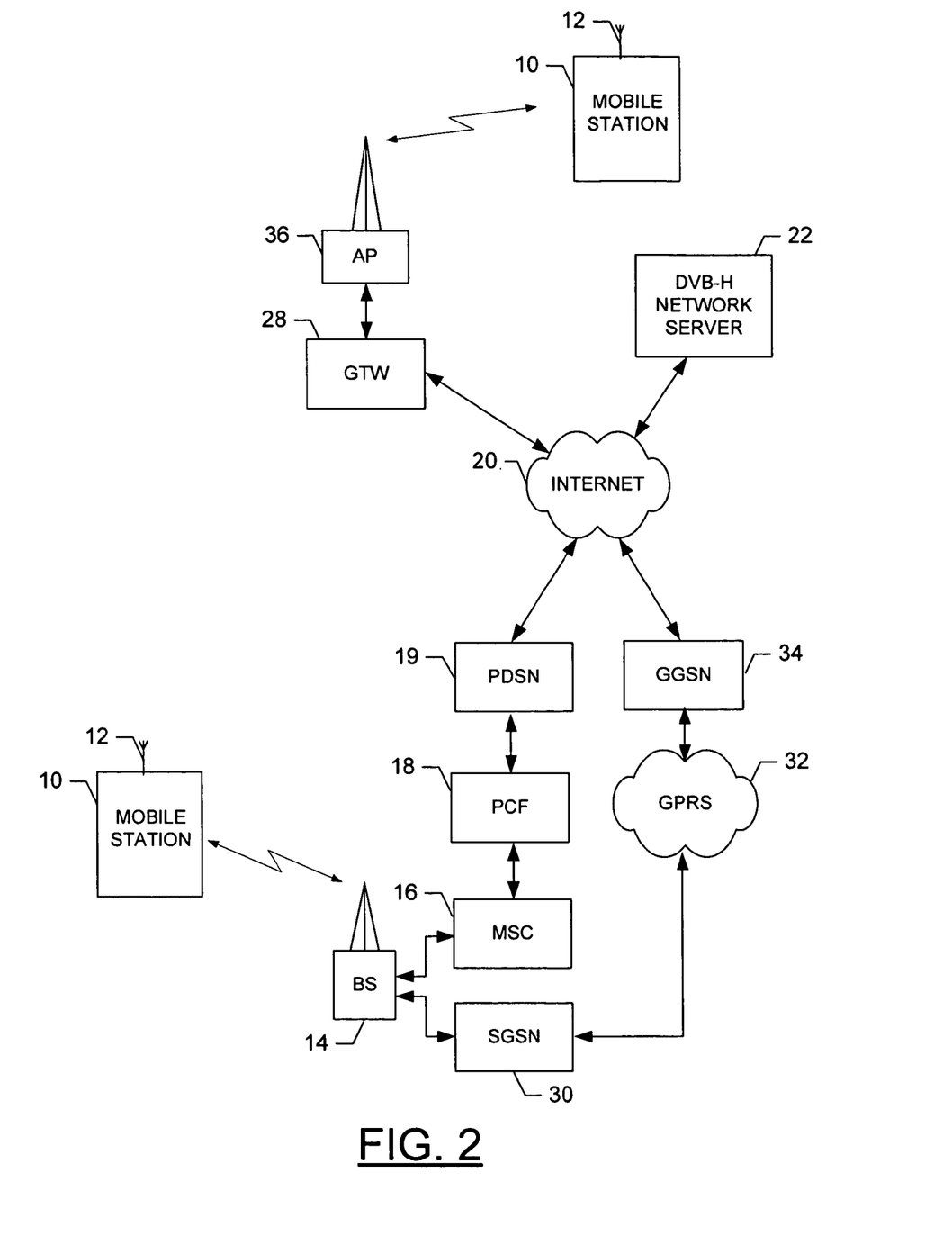
FIG. 2 is a block diagram of one type of system that would benefit from exemplary embodiments of the present invention.

Overall System and Mobile Device:

Referring to FIG. 2, an illustration of one type of system that would benefit from exemplary embodiments of the present invention is provided. As shown in FIG. 2, the system can include one or more mobile stations or devices 10 (configured to perform at least the process described above with regard to FIG. 1), each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the mobile station or device 10 via the Internet. For example, the processing elements can include a DVB-H Network Entity 22 (e.g., a server or similar electronic device associated with a DVB-H network), from which the DVB-H network time may be retrieved (as in Steps 102 and 107 of FIG. 1 above), and which is discussed in more detail below. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 2) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including Wireless LAN (WLAN) techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the mobile stations and the processing elements (e.g., DVB-H Network Entity 22) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile stations 10 to one or more processing elements (e.g., a server or similar electronic device associated with a DVB-H Network 22) across the Internet 20, one or more such entities may be directly coupled to one another. As such, one or more network entities may communicate with one another in accordance with, for example, RF, BT, IrDA or any of a number of different wireline or wireless communication techniques, including LAN and/or Wireless LAN techniques. Further, the mobile station 10 and the processing elements can be coupled to one or more electronic devices, such as printers, digital projectors and/or other multimedia capturing, producing and/or storing devices (e.g., other terminals).

Figure 3:
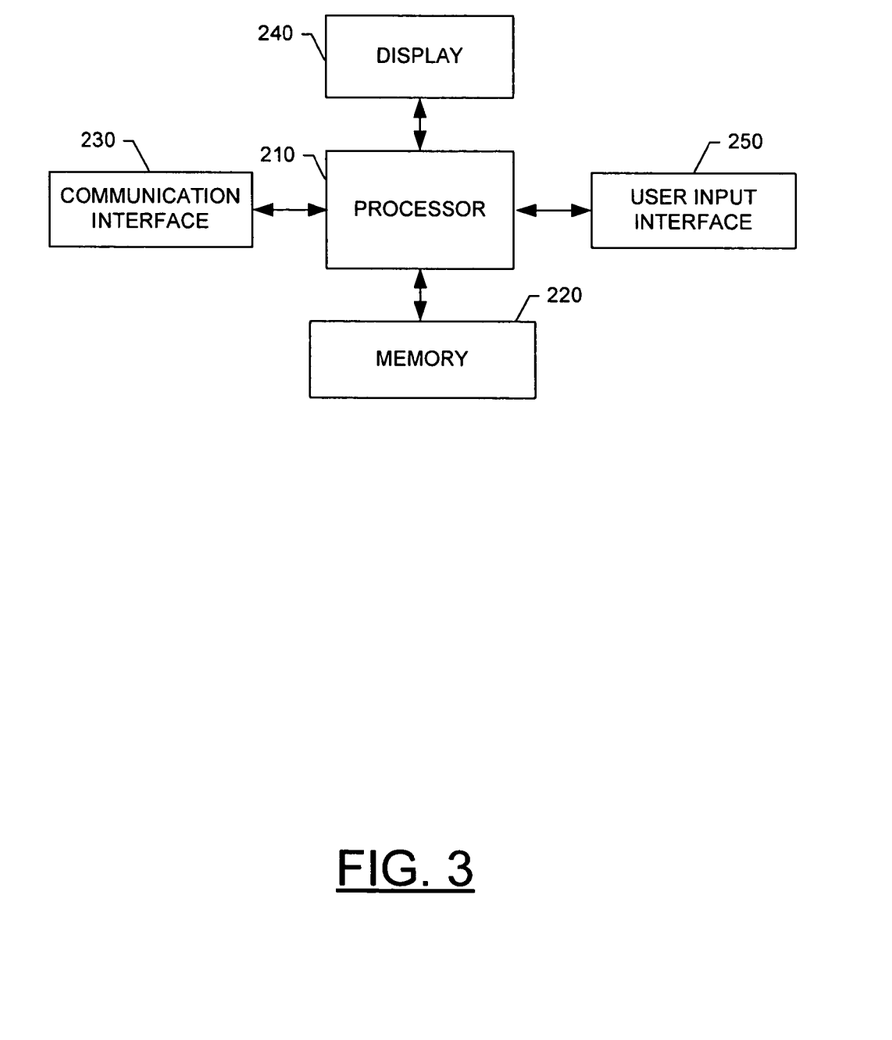
FIG. 3 is a schematic block diagram of an entity capable of operating as a DVB-H server, or similar electronic device, in accordance with exemplary embodiments of the present invention.

Referring now to FIG. 3, a block diagram of an entity capable of operating as a DVB-H Network Server, or similar electronic device, 22 is shown in accordance with one embodiment of the present invention. The entity capable of operating as a DVB-H Network Server 22 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as a DVB-H Network Server 22 can generally include means, such as a processor 210 connected to a memory 220, for performing or controlling the various functions of the entity. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. In one exemplary embodiment, the memory 220 may securely store the DVB-H network time discussed above, wherein upon receiving a request from the mobile device receiver for the DVB-H network time, the processor 210 may be configured to transmit the DVB-H network time stored in memory 220 to the mobile device.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 4:
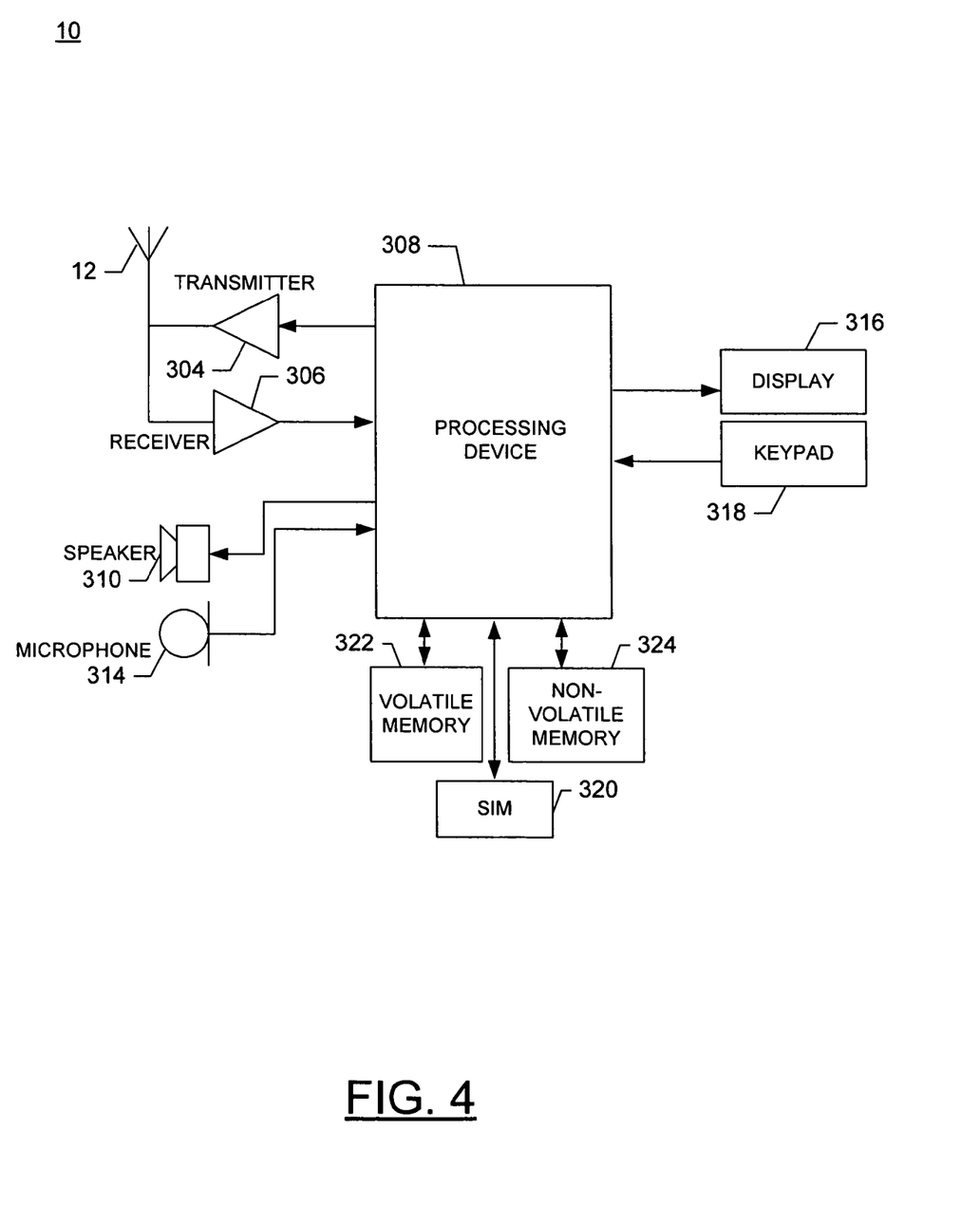
FIG. 4 is a schematic block diagram of a mobile device capable of operating m accordance with an exemplary embodiment of the present invention.

Reference is now made to FIG. 4, which illustrates one type of electronic device that would benefit from embodiments of the present invention. As shown, the electronic device may be a mobile station or device 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. For example, the mobile station may include means, such as an application stored in memory and executable by a processor, for maintaining a secure time source (e.g., DRM clock or time) and for updating the secure time source based on the DVB-H network time (e.g., in the manner described above with regard to FIG. 1). It should be understood, however, that one or more of the entities may include alternative means for performing one or more like functions, without departing from the spirit and scope of the present invention. More particularly, for example, as shown in FIG. 4, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content including, for example, one or more rights objects associated with content or services to be accessed or used by the mobile station, as well as data associated with both the user-set clock and the secure time source (e.g., DRM clock or time), discussed above.

The memory may further store computer program code for an application and other computer programs. For example, in one embodiment of the present invention, the memory may store computer program code for performing one or more of the steps discussed above with regard to FIG. 1. In particular, the memory may store computer program product for retrieving a DVB-H network time, updating the secure time source or clock based on the DVB-H time (e.g., by determining a difference between the DVB-H network time and the user-set clock of the mobile station), and using the secure time source to determine whether one or more rights objects associated with the mobile station are valid. As discussed above, the computer program code may comprise an IPDCManager software component that is configured to perform one or more of the above operations described with regard to FIG. 1, as well as a configuration file (e.g., IPDC.ini) that stores one or more parameters associated with IPDC over DVB-H including, for example, the predetermined interval of time after which the DVB-H network time should be retrieved.

The system, method, mobile station, apparatus and computer program product of exemplary embodiments of the present invention are primarily described in conjunction with mobile communications applications. It should be understood, however, that the system, method, mobile station, apparatus and computer program product of embodiments of the present invention can be utilized in conjunction with a variety of other applications, both in the mobile communications industries and outside of the mobile communications industries. For example, the system, method, mobile station, apparatus and computer program product of exemplary embodiments of the present invention can be utilized in conjunction with wireline and/or wireless network (e.g., Internet) applications.

Conclusion:

As described above and as will be appreciated by one skilled in the art, embodiments of the present invention may be configured as a system, method, mobile station and apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for determining whether one or more rights objects associated with the apparatus are valid, the apparatus comprising:
    a communication interface for transmitting and receiving data;
    at least one memory device for storing instructions;
    a processor communicatively coupled to the communication interface and the at least one memory device, the processor configured to, when executing the instructions, perform the following:
        retrieve a multimedia network time via the communication interface from a network transmitting multimedia;
        update a secure clock based at least in part on the multimedia network time and a user-set clock, wherein the secure clock is not user-changeable, updating the secure clock comprising:
            determining a difference between the multimedia network time and the user-set clock,
            storing the difference,
            calculating the secure clock based at least on the stored difference,
            re-retrieving the multimedia network time via the communication interface at every predetermined interval of time,
            at each interval, re-calculating a new difference between the multimedia network time and the user-set clock,
            replacing the stored difference with the new difference when the new difference differs from the stored difference, and
            re-calculating the secure clock based on the new stored difference; and
        use the secure clock to determine whether one or more rights objects associated with the apparatus are valid.

2. The apparatus of claim 1, wherein the secure clock is configured to check whether a time period during with the one or more rights objects is valid.

3. The apparatus of claim 1, wherein the processor, when retrieving the multimedia network time, is further configured to automatically send a request via the communication interface for the multimedia network time to a network entity upon boot up of the apparatus.

4. The apparatus of claim 1, wherein the processor, when retrieving the multimedia network time, is further configured to send a request for the multimedia network time, via the communication interface to a network entity.

5. The apparatus of claim 4, wherein the processor, when executing the instructions, is further configured to re-send, via the communication interface, the request to the network entity for the multimedia network time in response to an error message indicating that the mobile device is outside of a multimedia signal coverage area.

6. The apparatus of claim 5, wherein the processor is configured to re-send the request via the communication interface for a predetermined number of times.

7. The apparatus of claim 5, wherein the processor is configured to re-send the request via the communication interface until the multimedia network time is retrieved.

* * * * *